(12) United States Patent
Vasseur et al.

(10) Patent No.: US 11,616,712 B2
(45) Date of Patent: *Mar. 28, 2023

(54) MACHINE LEARNING APPROACH FOR DYNAMIC ADJUSTMENT OF BFD TIMERS IN SD-WAN NETWORKS

(71) Applicant: Cisco Technology, Inc., San Jose, CA (US)

(72) Inventors: Jean-Philippe Vasseur, Saint Martin d'uriage (FR); Vinay Kumar Kolar, San Jose, CA (US); Grégory Mermoud, Venthône (CH)

(73) Assignee: Cisco Technology, Inc., San Jose, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/330,720

(22) Filed: May 26, 2021

(65) Prior Publication Data

US 2021/0281504 A1 Sep. 9, 2021

Related U.S. Application Data

(63) Continuation of application No. 16/434,263, filed on Jun. 7, 2019, now Pat. No. 11,032,181.

(51) Int. Cl.
*H04L 43/103* (2022.01)
*H04L 41/0654* (2022.01)
*H04L 41/0631* (2022.01)
*H04L 43/0823* (2022.01)

(52) U.S. Cl.
CPC ........ *H04L 43/103* (2013.01); *H04L 41/0631* (2013.01); *H04L 41/0672* (2013.01); *H04L 43/0847* (2013.01)

(58) Field of Classification Search
CPC ............... H04L 43/103; H04L 41/0631; H04L 41/0672; H04L 43/0847; H04L 41/5025; H04L 41/0663; H04L 43/0852; H04L 43/0894; H04L 41/147; H04L 41/16
See application file for complete search history.

(56) References Cited

U.S. PATENT DOCUMENTS

| | | | |
|---|---|---|---|
| 8,797,886 B1 * | 8/2014 | Kompella | H04L 45/70 370/242 |
| 9,300,563 B2 | 3/2016 | Rahman et al. | |
| 9,407,526 B1 | 8/2016 | Addepalli et al. | |
| 9,781,058 B1 | 10/2017 | Addepalli et al. | |
| 9,819,511 B2 | 11/2017 | Jain et al. | |
| 2011/0013520 A1 * | 1/2011 | Dunn | H04L 43/103 370/242 |

(Continued)

*Primary Examiner* — Jung H Park
(74) *Attorney, Agent, or Firm* — Behmke Innovation Group LLC; James M. Behmke; Jonathon P. Western (57) ABSTRACT

In one embodiment, a device obtains performance data regarding failures of a tunnel in a network. The device generates a failure profile for the tunnel by applying machine learning to the performance data regarding the failures of the tunnel. The device determines, based on the failure profile for the tunnel, whether the tunnel exhibits failure flapping behavior. The device adjusts one or more Bidirectional Forwarding Detection (BFD) probing timers used to detect failures of the tunnel, based on the determination as to whether the tunnel exhibits failure flapping behavior.

20 Claims, 9 Drawing Sheets (56) References Cited

U.S. PATENT DOCUMENTS

| | | | |
|---|---|---|---|
| 2014/0019614 A1* | 1/2014 | Rahman | H04L 43/10 709/224 |
| 2015/0103830 A1* | 4/2015 | Kampmann | H04L 45/64 370/392 |
| 2020/0067809 A1* | 2/2020 | K | H04L 43/026 |

* cited by examiner

MACHINE LEARNING APPROACH FOR DYNAMIC ADJUSTMENT OF BFD TIMERS IN SD-WAN NETWORKS

CROSS-REFERENCE TO RELATED APPLICATION

This application is a Continuation Application of U.S. patent application Ser. No. 16/434,263, filed Jun. 7, 2019, entitled MACHINE LEARNING APPROACH FOR DYNAMIC ADJUSTMENT OF BFD TIMERS IN SD-WAN NETWORKS, by Jean-Philippe Vasseur, et al., the contents of which are incorporated herein by reference.

TECHNICAL FIELD

The present disclosure relates generally to computer networks, and, more particularly, to a machine learning approach for dynamic adjustment of Bidirectional Forwarding Detection (BFD) timers in software-defined wide area networks (SD-WANs).

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs.

Failure detection in a network has traditionally been reactive, meaning that the failure must first be detected before rerouting the traffic along a secondary (backup) path. In general, failure detection leverages either explicit signaling from the lower network layers or using a keep-alive mechanism that sends probes at some interval T that must be acknowledged by a receiver (e.g., a tunnel tail-end router). Typically, SD-WAN implementations leverage the keep-alive mechanisms of Bidirectional Forwarding Detection (BFD), to detect tunnel failures and to initiate rerouting the traffic onto a backup (secondary) tunnel, if such a tunnel exits. Notably, if BFD times out for a given tunnel, the tunnel may be considered down, and its traffic rerouted onto a backup/secondary tunnel.

Two main parameters exist with respect to BFD messages: 1.) the frequency at which BFD hello messages are sent, also referred to as the BFD interval, and 2.) the timeout value, also sometimes called the 'multiplier,' which define how long the tunnel has to acknowledge the BFD hello before the tunnel is flagged as down. The main challenge in setting these parameters in an SD-WAN is that settings that are too aggressive (e.g., a short BFD interval and a small multiplier) will lead to potentially inappropriate tunnel failure events. Indeed, BFD probes may simply be dropped temporarily, to address congestion on a tunnel. Conversely, increasing the BFD interval and/or the multiplier can be equally problematic, as SD-WAN tunnel convergence is notoriously slow compared to classic Interior Gateway Protocol (IGP) or MPLS-Traffic Engineering (TE) fast reroute.

DESCRIPTION OF EXAMPLE EMBODIMENTS

Overview

According to one or more embodiments of the disclosure, a device obtains performance data regarding failures of a tunnel in a network. The device generates a failure profile for the tunnel by applying machine learning to the performance data regarding the failures of the tunnel. The device determines, based on the failure profile for the tunnel, whether the tunnel exhibits failure flapping behavior. The device adjusts one or more Bidirectional Forwarding Detection (BFD) probing timers used to detect failures of the tunnel, based on the determination as to whether the tunnel exhibits failure flapping behavior.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
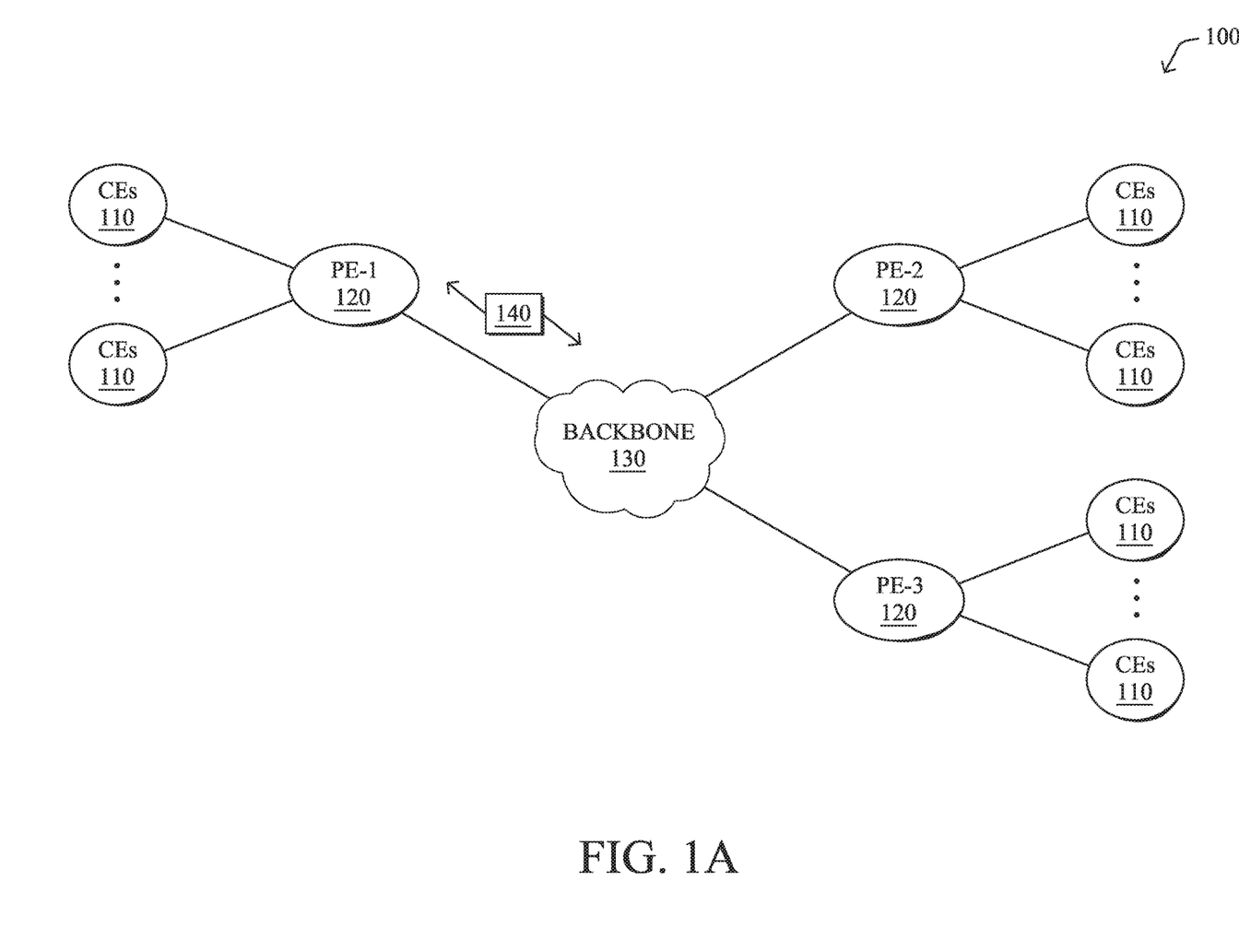
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
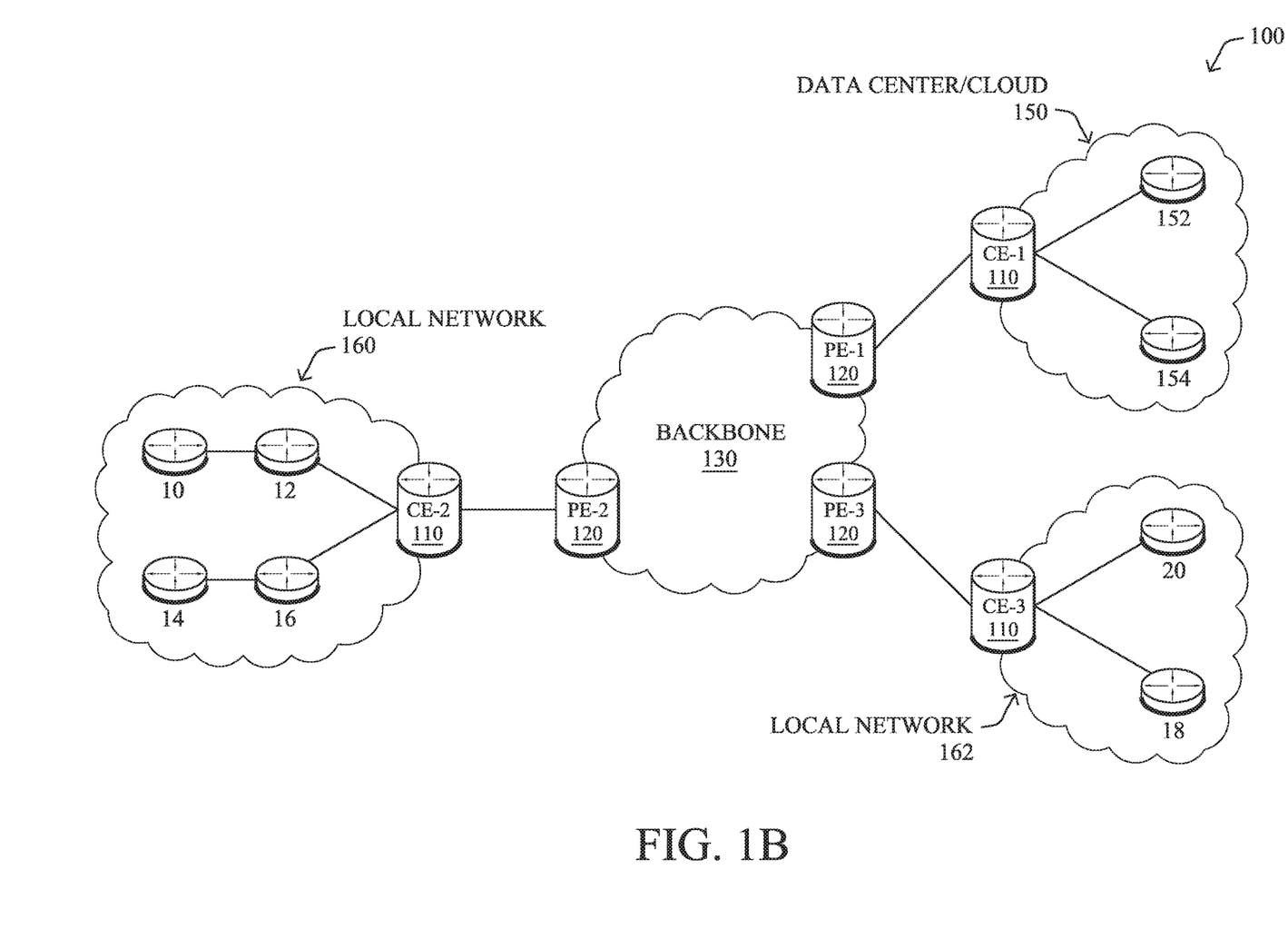

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud 150 on top of the various underlying connections. Another feature of SD-WAN is centralized management by a supervisory service that can monitor and adjust the various connections, as needed.

Figure 2:
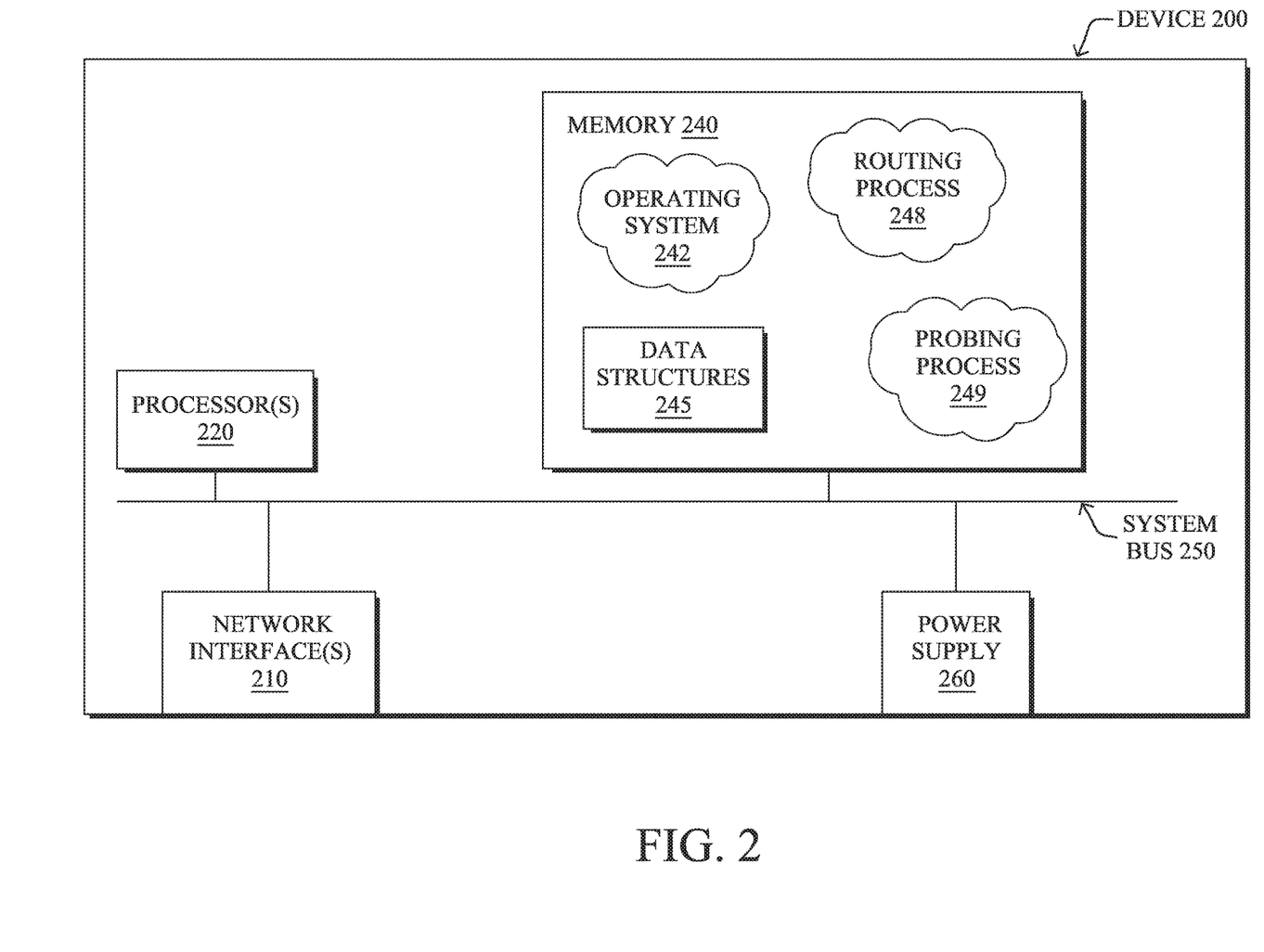
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 248 and/or a probing process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process (services) 248 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 248 may also include computer executable instructions that, when executed by processor(s) 220, cause device 200 to predict failures of network elements in the network (e.g., a link or node/device), thereby allowing device 200 to proactively reroute traffic to avoid the failed element. To do so, in some embodiments, routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 248 may employ one or more supervised, unsupervised, or semi-supervised machine learning models. Generally, supervised learning entails the use of a training set of data, as noted above, that is used to train the model to apply labels to the input data. For example, the training data may include sample network telemetry that has been labeled as indicative of a network element failure, such as failure of a link or node/device, or indicative of normal operation. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior. Semi-supervised learning models take a middle ground approach that uses a greatly reduced set of labeled training data.

Example machine learning techniques that routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that a network element will fail. Conversely, the false negatives of the model may refer to the number of times the model predicted normal network element operations, when the network element actually fails. True negatives and positives may refer to the number of times the model correctly predicted whether a network element will perform normally or will fail, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, failure detection in a network has traditionally been reactive, meaning that the failure must first be detected before rerouting the traffic along a secondary (backup) path. This is true, not only for IP and MPLS networks, but also for optical networks (with protection and restoration) such as SONET and SDH networks. Typically, failure detection leverages either explicit signaling from the lower network layers (e.g., optical failures signaled to the upper layers) or using a keep-alive mechanism that sends probes at some interval T that must be acknowledged by a receiver (e.g., a tunnel tail-end router). For example, routing protocols such as Open Shortest Path First (OSPF) and Intermediate System to Intermediate System (ISIS) use keep-alive signals over routing adjacencies or MPLS traffic engineering (TE) tunnels. Protocols such as Bidirectional Forwarding Detection (BFD) also make use of keep-alive mechanisms.

Figure 3:
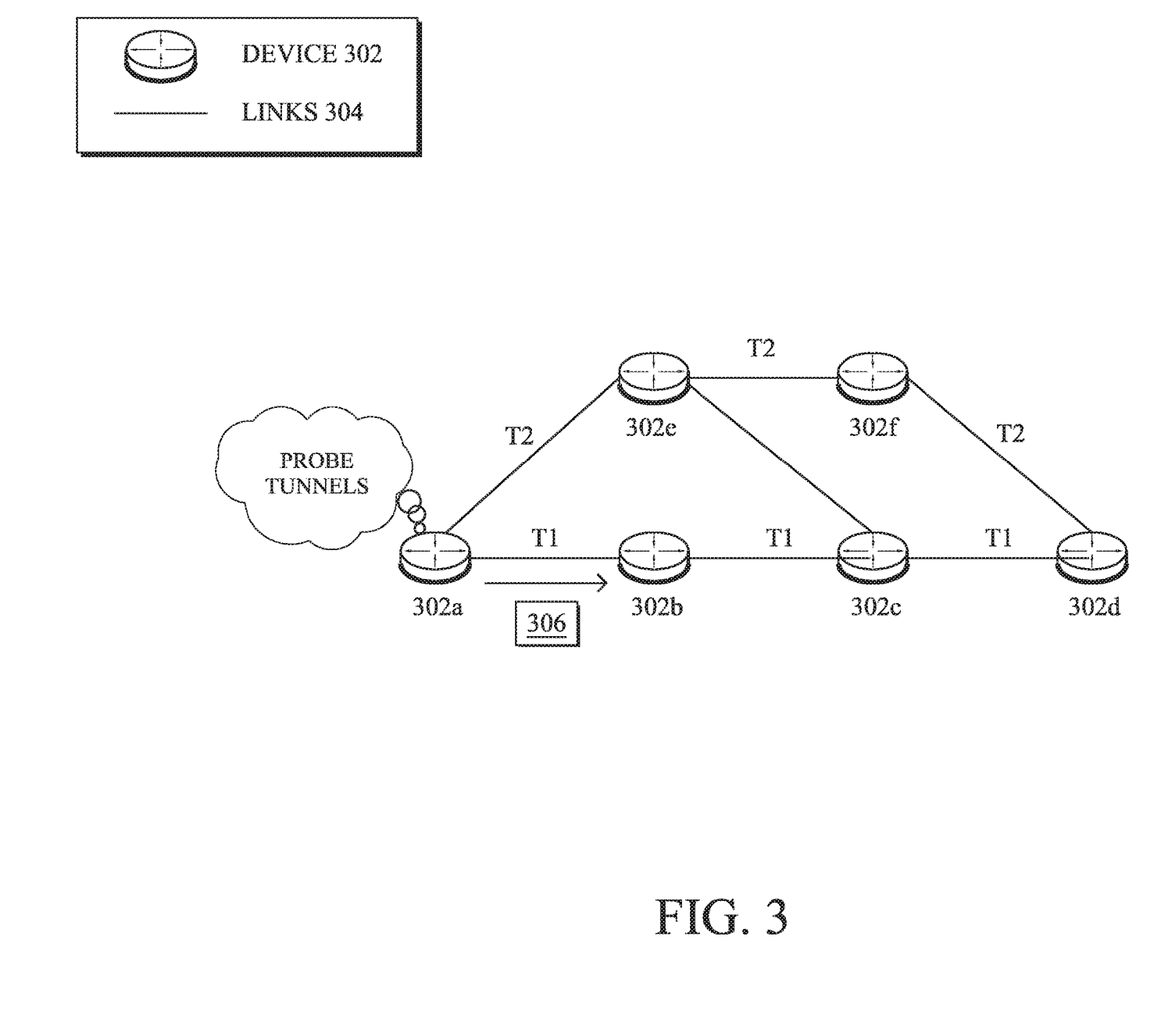
FIG. 3 illustrates an example architecture for predicting failures in a network.

Traditionally, failure detection in an SD-WAN has relied on the keep-alive mechanisms of BFD over tunnels, such as IPSec tunnels. When the BFD signaling times out, the tunnel is flagged as failed and traffic is rerouted onto another tunnel. By way of example, as shown in FIG. 4, assume a plurality of devices 302a-302f are interconnected by links 304 and a tunnel T1 connects a head-end device 302a with a tail-end device 302d. A second tunnel T2 may also connect head-end device 302a with tail-end device 302d and function as a backup path for T1.

As noted above, detecting a failure of tunnel T1 can be performed either through the use of some explicit signal from lower layers or through the use of a keep-alive mechanism that consists in sending probes at regular time intervals that must be acknowledged by a receiver. For example, as shown, head-end device 302a for tunnel T1 may periodically send BFD probes 306 towards the tail-end device 302d for tunnel T1. In turn, tail-end device 302d must acknowledge receipt of probes 306 to device 302a within a configured amount of time. Thus, if head-end device 302a determines that probes 306 were not acknowledged, device 302a may determine that tunnel T1 has failed and initiate rerouting of the traffic from T1 onto the backup tunnel T2.

The main challenge with using a BFD keep-alive mechanism lies in determining the appropriate values for 1.) the BFD hello frequency, sometimes called the BFD interval, and 2.) the timeout value, also called the multiplier, denoted K. Notably, BFD probes are sent every BFD interval, and the tunnel is deemed as having failed without acknowledgement after K*BFD interval.

Setting the values too aggressively for the above parameters (e.g., using a short BFD interval and small value for the multiplier K) leads to potential inappropriate tunnel failures events. Indeed, BFD probes may simply be dropped in the network, local congestion may also take place leading to temporary drops and thus tunnel failures. This may also seriously impact the router performance on a router acting as a hub that has to acknowledge large number of BFD probes. This may even trigger instabilities in the network (tunnel flaps), which can be (partially) mitigated with hysteresis.

Conversely, increasing the BFD interval and/or multiplier does increase the failure detection time when the tunnel is actually down, thus increasing the impact on the traffic. One must also bear in mind that SD-WAN tunnel convergence is notoriously slow when compared to classic IGP or MPLS-TE Fast Reroute.

A Machine Learning Approach for Dynamic Adjustment of BFD Timers in SD-WAN Networks The techniques herein leverage machine learning to optimize BFD timers with regards to link failure profiles. Indeed, some links may exhibit very different failure patterns. At one extreme of the spectrum, some networks are known to be highly reliable, such as over-provisioned IP networks over optical networks that make use of fast protection-recovery. If a BFD probe is lost in such a network, the link is very likely to be failing, thus requiring the tunnel to fail as quickly as possible. Such a situation may lead to more aggressive timers, which have a low risk of triggering a false positive. Conversely, if the link is lossy, as in the case of IEEE 802.15.4 links, PLC links, VSat links, etc., and prone to error, BFD probes are more likely to be lost, and a more conservative approach should be taken.

Specifically, according to one or more embodiments herein, a device obtains performance data regarding failures of a tunnel in a network. The device generates a failure profile for the tunnel by applying machine learning to the performance data regarding the failures of the tunnel. The device determines, based on the failure profile for the tunnel, whether the tunnel exhibits failure flapping behavior. The device adjusts one or more Bidirectional Forwarding Detection (BFD) probing timers used to detect failures of the tunnel, based on the determination as to whether the tunnel exhibits failure flapping behavior.

Illustratively, the techniques described herein may be performed by hardware, software, and/or firmware, such as in accordance with the routing process 248 and the probing process 249, which may include computer executable instructions executed by the processor 220 (or independent processor of interfaces 210) to perform functions relating to the techniques described herein.

Operationally, the probing techniques herein have been driven by the analysis of many datasets across a large variety of actual networks. Based on this analysis, a constant pattern that was observed is that certain tunnels exhibit what is referred to herein as failure flapping behavior in which a tunnel oscillates between "down" and "up" states, whereas other tunnels do not exhibit much flapping. In order to determine the influence of BFD timers on this behavior, the number of times a tunnel experiences a BFD flap event were analyzed.

From analysis of the live networks, a maximum of three million BFD flaps per-day were observed across all networks, with one contributing up to 2.6 million flaps per day. Thus, BFD flaps are a very common occurrence and can often lead to traffic disruptions in SD-WANs. Further, it was observed that the top 1% of flapping tunnels contributed anywhere from 5% to 75% of the total number of BFD flaps.

Additionally, the flapping behavior of a tunnel is not always present such that applying one set of probe timer values will always be appropriate. Indeed, failure flapping behavior was found to be dynamic and often changes drastically over time. This observation further suggests that a dynamic choice of BFD timer value(s) may reduce false declarations of tunnel failure.

Figure 4A:
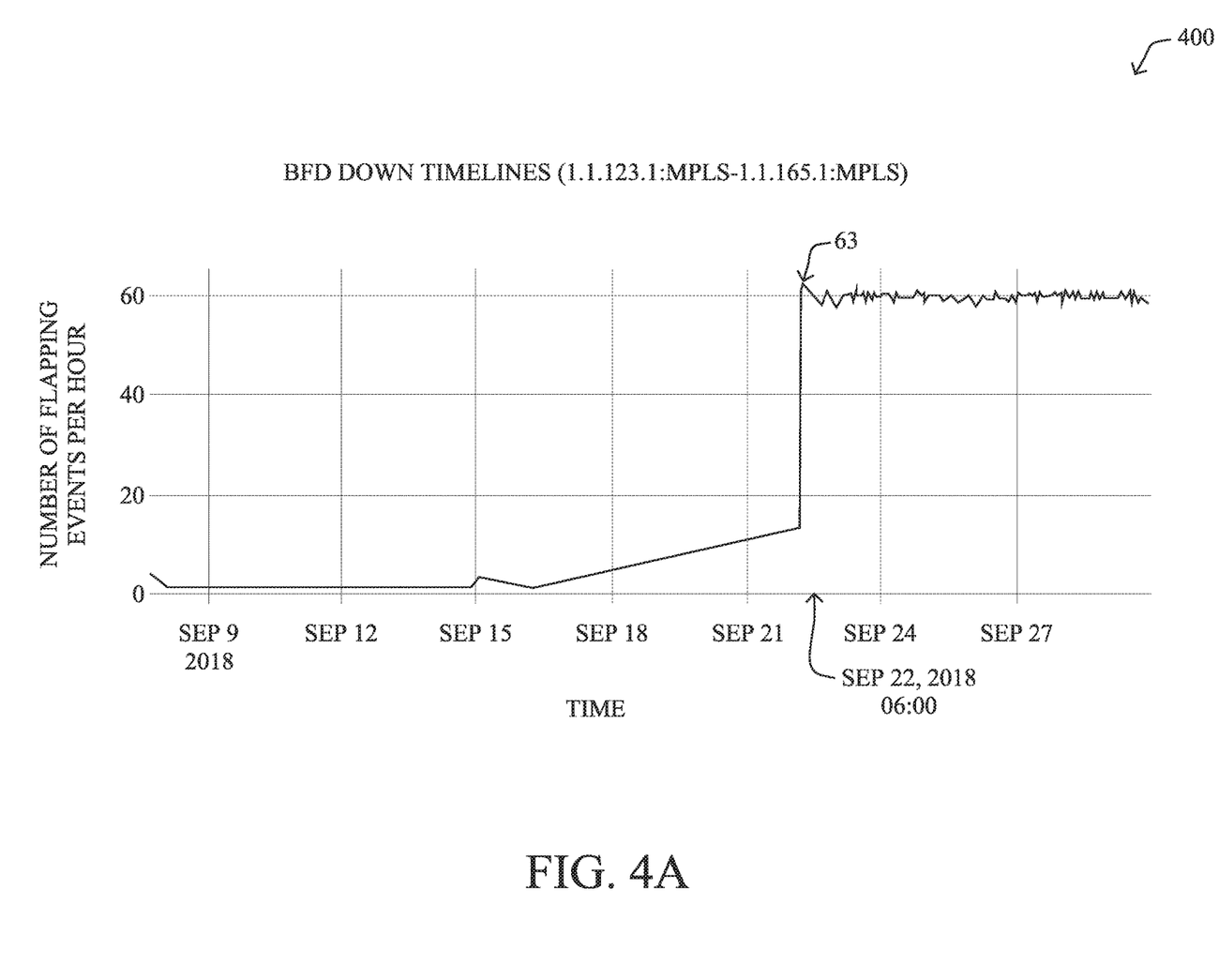
FIGS. 4A-4B illustrate example plots showing failure flapping behavior of a tunnel.

For purposes of illustration, FIG. 4A shows a plot 400 of the number of flapping events of a tunnel that were observed over multiple days in a live network. The number of oscillations between 'down' and 'up' were aggregated on an hourly basis and are shown on the y-axis of plot 400. As shown, it can be seen that until Sep. 22, 2018, the tunnel did not exhibit many oscillations. However, from this date forward, the tunnel experienced extreme flapping, on the order of roughly 60 flaps per hour, which is approximately one flap per minute.

Figure 4B:
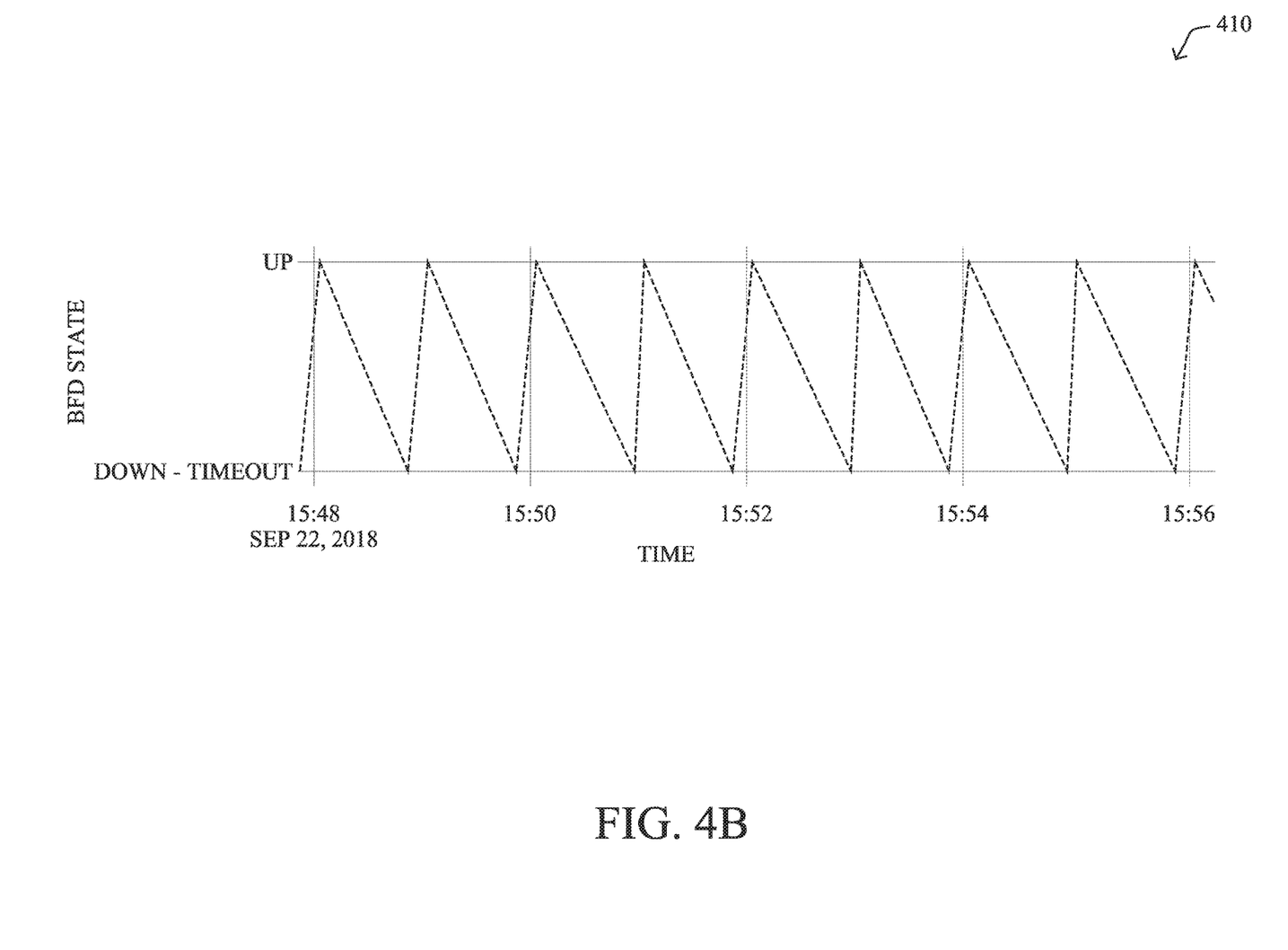

FIG. 4B illustrates a plot 410 for the tunnel of FIG. 4A with greater temporal granularity. As can be seen, the tunnel heavily oscillates between cases in which the BFD probes sent along the tunnel timed out, leading the tunnel to be deemed as being down, and states in which the probes were acknowledged in time and the tunnel was deemed as being up/available.

Figure 5:
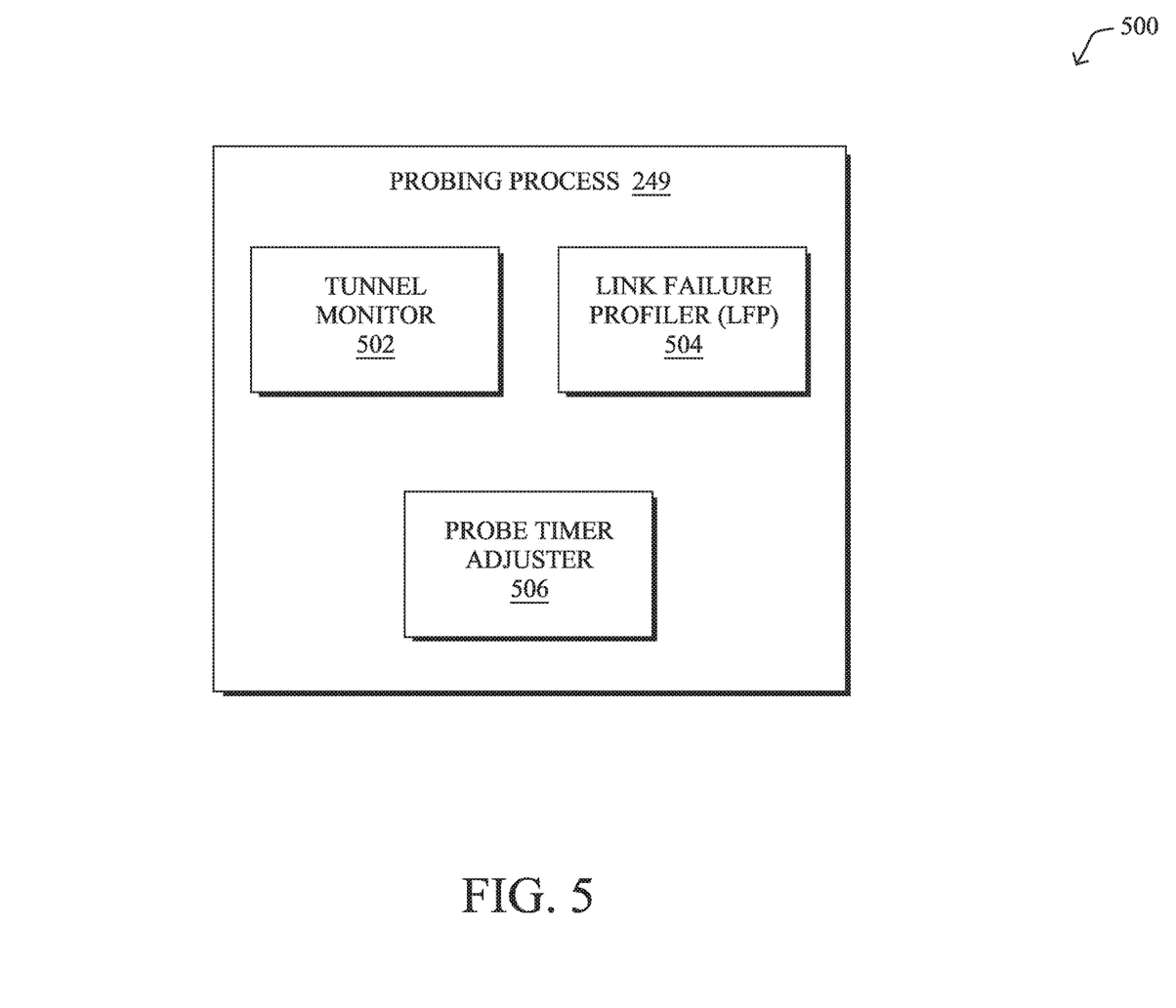
FIG. 5 illustrates an example architecture for dynamically adjusting probing timer(s)

FIG. 5 illustrates an example architecture 500 for dynamically adjusting probing timer(s), according to various embodiments. At the core of architecture 500 is probing process 249 which may operate in conjunction with routing process 248. As shown, process 249 may comprise the following components: a tunnel monitor 502, a link failure profiler 504, and/or a probe timer adjuster 506. These components 502-506 may be implemented in a centralized or distributed manner and their functionalities may be combined or omitted, as desired. For example, in some cases, a (head end) router or other networking device may execute probing process 249, to probe tunnels in an SD-WAN. In other cases, the networking device may execute at least a portion of probing process 249 in conjunction with a supervisory service (e.g., service 310), in which case the executing devices can be similarly viewed as a single device for purposes of implementing process 249.

As shown, probing process 249 may include tunnel monitor 502, which is configured to accumulate historical performance information about link/tunnel failures for any number of tunnels in the network. Such performance information may include statistics about tunnel failure flap events, such as the frequency of flaps, resulting packet loss, resulting packet latency, etc. Tunnel monitor 502 may also, in some cases, identify the type of failure, such as due to an interface going down, a BFD timeout, or the like. This provides additional information about the failure behavior of the tunnel. If the failure is caused by a lower layer, the root cause is unambiguous: for example, if the tunnel fails because the interface failed (detected using lower layer signals, or the interface was shut down by the user), then the root cause is known. Conversely, if the tunnel fails because of a BFD timeout, it may be because of the tail-end router, the service provider network, or the like. More generally, the performance data obtained by tunnel monitor 502 may be indicative of a number of failures of the tunnel and how long the tunnel is down after each of these failures.

In various embodiments, probing process 249 may also include link failure profiler (LFP) 504 which is configured to profile the types of link/tunnel failures exhibited by a tunnel under scrutiny. This can be achieved through any of the following:

Detecting Failure Seasonality: In some cases, the tunnel failures may be seasonal in nature, meaning that they occur at periodic times. This could be due, for example, to the service provider experiencing periodic issues (e.g., every Friday at 4:00 PM), excessive load on a tail-end router that results in that router failing to acknowledge BFD probes (e.g., due to high CPU consumption, etc.), etc. In some embodiments, LFP 504 may use logistic regression or another suitable machine learning approach, to detect such seasonality.

Computing Groups of Failure Profiles: In further embodiments, LFP 504 may cluster the performance data for multiple tunnels, to find groups of different failure behaviors. Clustering algorithms such as DB-SCAN are well suited for this approach.

A prototype of LFP 504 was constructed using tunnel performance data collected from a live network over the span of one month. This data included the following tunnel health metrics for each tunnel: the number of tunnel failures (num_failures), the total duration the tunnel was down (total_down_duration), and the total duration the tunnel was up (total_up_duration). These metrics were then scaled on the range of (0, 1) and DBSCAN clustering applied to the scaled metrics, to dynamically determine the different categories of behavior exhibited by the tunnels.

Figure 6:
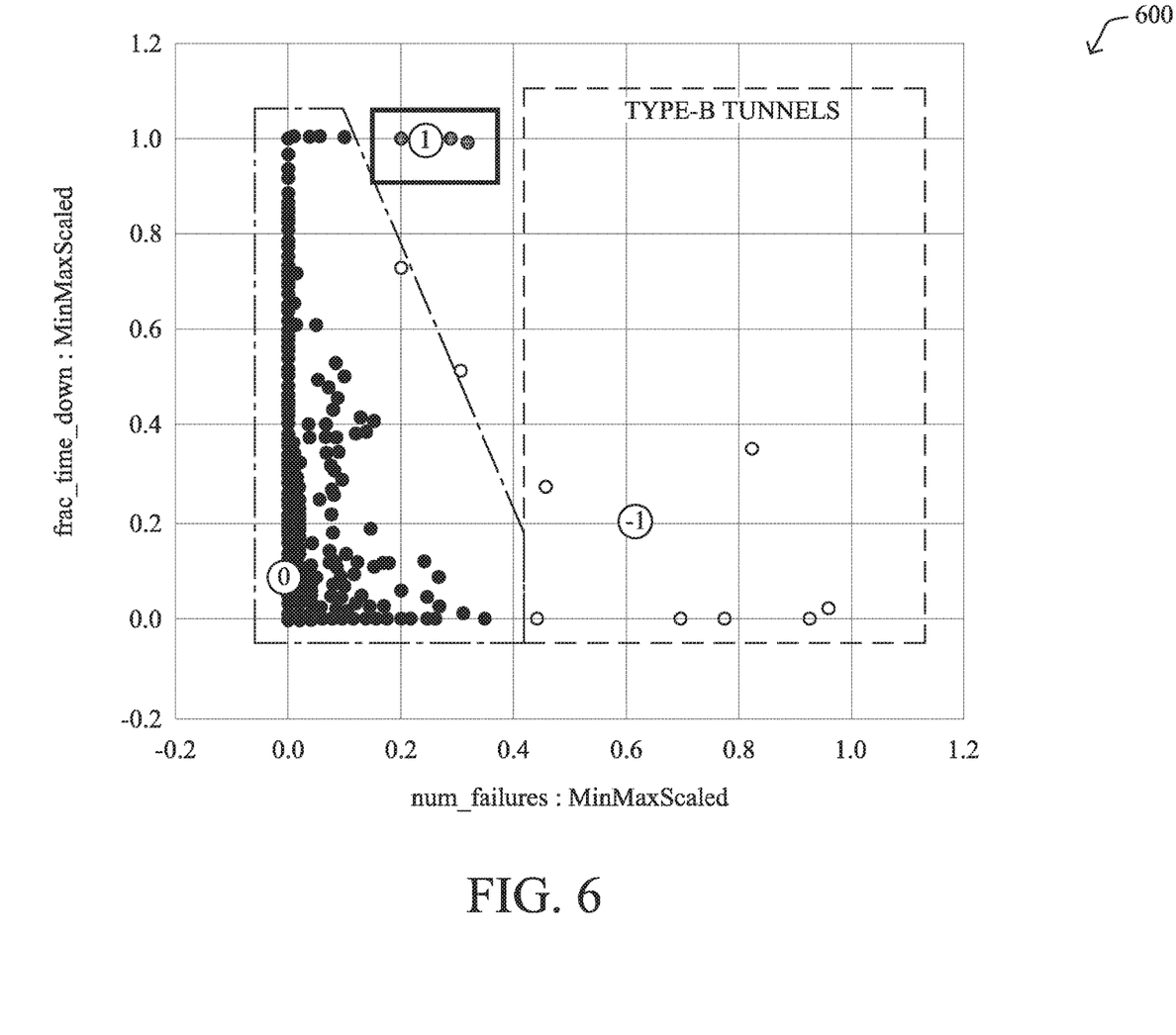
FIG. 6 illustrates an example plot of tunnels clustered by their performance data.

FIG. 6 illustrates an example plot 600 of the tunnels clustered by their performance data from the above experiment. The x-axis of plot 600 represents the log(num_failures) and is MinMaxScaled. Similarly, the y-axis of plot 600 represents the log(frac_time_down), also MinMaxScaled, which is the fraction of time that a tunnel was down. Note that since the log transformation is taken on the num_failures metric, and then MinMaxScaled, the values very close to 1 are highly failing tunnels.

As can be seen in plot 600, there are three different clusters of tunnels:

Cluster 602: This cluster is associated with tunnels that have a low number of failures (e.g., 0 to 40% of the maximum), and their fraction of time down may range from 0 to 1 on the scale shown. A vast majority of the tunnels belong to this cluster.

Cluster 604: Here, there are tunnels that have high number of flaps and are down most of the time. Such tunnels are hardly usable, since they flap often and are almost always down.

Cluster 606 (Type-B tunnels): These are the outlier tunnels that have a very high number of flaps. While these tunnels often fail, they are not always down and recover back to their 'up' states. Accordingly, the BFD timer(s) used to probe these tunnels can be tuned such that they do not flap as often.

Referring again to FIG. 5, in one embodiment, LFP 504 may be hosted in the cloud and assess tunnel performance data from any number of edge routers. Note that knowing the mechanism used to detect the failures may be advantageously used by a central algorithm used in the cloud. Indeed, if a router A reports historical tunnel performance data related to failures caused by a high CPU hit for a tail-end router B, LFP 504 can use this information to determine the root cause of the tunnel flaps for all tunnels terminating on router B. Said differently, by aggregating all tunnel failure profiles in a central location, LFP 504 can perform a more accurate analysis. In another embodiment, LFP 504 may be executed locally on the (head-end) router for all failures related to the tunnel that it originates.

According to various embodiments, LFP 504 may be in charge of detecting two groups of failure profiles:

Highly stable tunnels (Type-A): Tunnels in this group rarely fail and, when they do, tend to not flap. These are tunnels that are routed onto highly stable networks and without major issues on either the head-end or the tail-end router that may lead to failures because of local interface congestion, low memory state, or high CPU consumption. In the example clustering plot 600 in FIG. 6, for example, these tunnels would correspond to cluster 602, which do not flap often.

Highly flapping tunnels (Type-B): Tunnels in this group exhibit flapping behavior with high frequency (e.g., about a defined threshold). For example, in plot 600 in FIG. 6, these would correspond to the tunnels associated with cluster 606, which flap very often.

Note that the sets of type-A and/or type-B tunnels may be empty, in some cases. When this occurs, there may not be any candidates for BFD parameter optimization.

Probing process 249 may also include probe timer adjuster 506, which is responsible for dynamically adjusting the BFD timer(s)/parameter(s) for type-A and type-B tunnels. As noted, BFD probing generally entails the use of two timers: 1.) an interval timer that controls a frequency at which BFD probes are sent via the tunnel and 2.) a timeout timer that controls when the tunnel is deemed to have failed after a BFD probe is sent via the tunnel and was unacknowledged. During execution, probe timer adjuster 506 may adjust either or both of these settings, depending on the failure profile of the tunnel under scrutiny, as determined by LFP 504.

In the case of a Type-A tunnel, probe timer adjuster 506 make take an incremental approach, reducing the timeout timer and monitoring the resulting rate of failures on the tunnel. For example, probe timer adjuster 506 may reduce the multiplier K, with the goal being to allow for faster convergence times. In turn, tunnel monitor 502 may monitor the affected tunnel for a defined duration for any increase in tunnel failures. If such an increase is observed, probe timer adjuster 506 may stop decrementing the timeout timer and set it to be the last, best value. In order to avoid oscillating between two nearby K values, probe timer 506 may also ensure that K is not incremented or decremented too aggressively.

At this point, LFP 504 may report the gain in terms of convergence time for the tunnel compared to previous BFD timer settings to a user interface. This allows the network administrator to review the changes in the BFD timer(s) and how they affect the failure behavior of the tunnel.

For Type-B tunnels, probe timer adjuster 506 may increase either or both of the interval timer and the timeout timer of the probes. In some embodiments, this may also be conditioned on whether there are any backup/alternative tunnels available for the tunnel under scrutiny that can also meet the SLA of the traffic on the tunnel under scrutiny. Indeed, in contrast with the previous situation where reducing BFD timers allows for improving the SLA by reducing the convergence time without any downside effect, increasing the BFD timers for Type-B tunnels would lead to less tunnel failures, but the traffic would then be routed via a tunnel that is artificially kept alive. In such case, the traffic may suffer from QoS degradation or may be dropped altogether, even if a suitable secondary tunnel meeting the required SLA exists.

In one embodiment, probe timer adjuster 506 may examine whether a secondary tunnel exists that satisfies the required SLA of the traffic on the tunnel under scrutiny. To do so, probe timer adjuster 506 may send statistics to a central cloud service regarding the type of traffic conveyed via the tunnel under scrutiny. Such statistics may indicate the type of traffic sent onto the Type-B tunnel, which can be used to retrieve the SLA requirements for the traffic, along with the routing policy, and statistics related to the measured SLA onto potential second paths (measured using BFD probes). If a secondary path exists that provides the required SLA, then probe timer adjuster 506 will not adjust the BFD timer(s) for that tunnel. Conversely, if no suitable backup tunnel exists that can meet the SLA of the affected traffic, probe timer adjuster 506 may increment the BFD timer(s) of the tunnel using a similar approach as that for the Type-A tunnels.

In another embodiment, probe timer adjuster 506 may still adjust the BFD timer(s) of the tunnels, even if a secondary tunnel is available, in an attempt to fix the tunnel under scrutiny. To do so, probe timer adjuster 506 may cause the traffic on the tunnel under scrutiny to be rerouted onto the backup tunnel that can meet the SLAs of the traffic and then begin tuning the BFD timer(s) of the tunnel under scrutiny. This allows probe timer adjuster 506 to take a more aggressive approach, since no applications are currently routed on the tunnel. For example, probe timer adjuster 506 may multiplicatively increase and additively decrease (MIAD) the interval timer and/or the timeout timer, until the tunnel stops exhibiting flapping behavior. Of course, probe timer adjuster 506 may abandon this attempt if the health of the tunnel does not improve or after a defined number of iterations.

If there is no suitable backup tunnel available, probe timer adjuster 506 may instead take a more conservative approach to adjusting the BFD timer(s). For example, probe timer adjuster 506 may employ an additive increase additive decrease (AIAD) approach, so that the QoS of the affected application(s) does not degrade, drastically.

Figure 7:
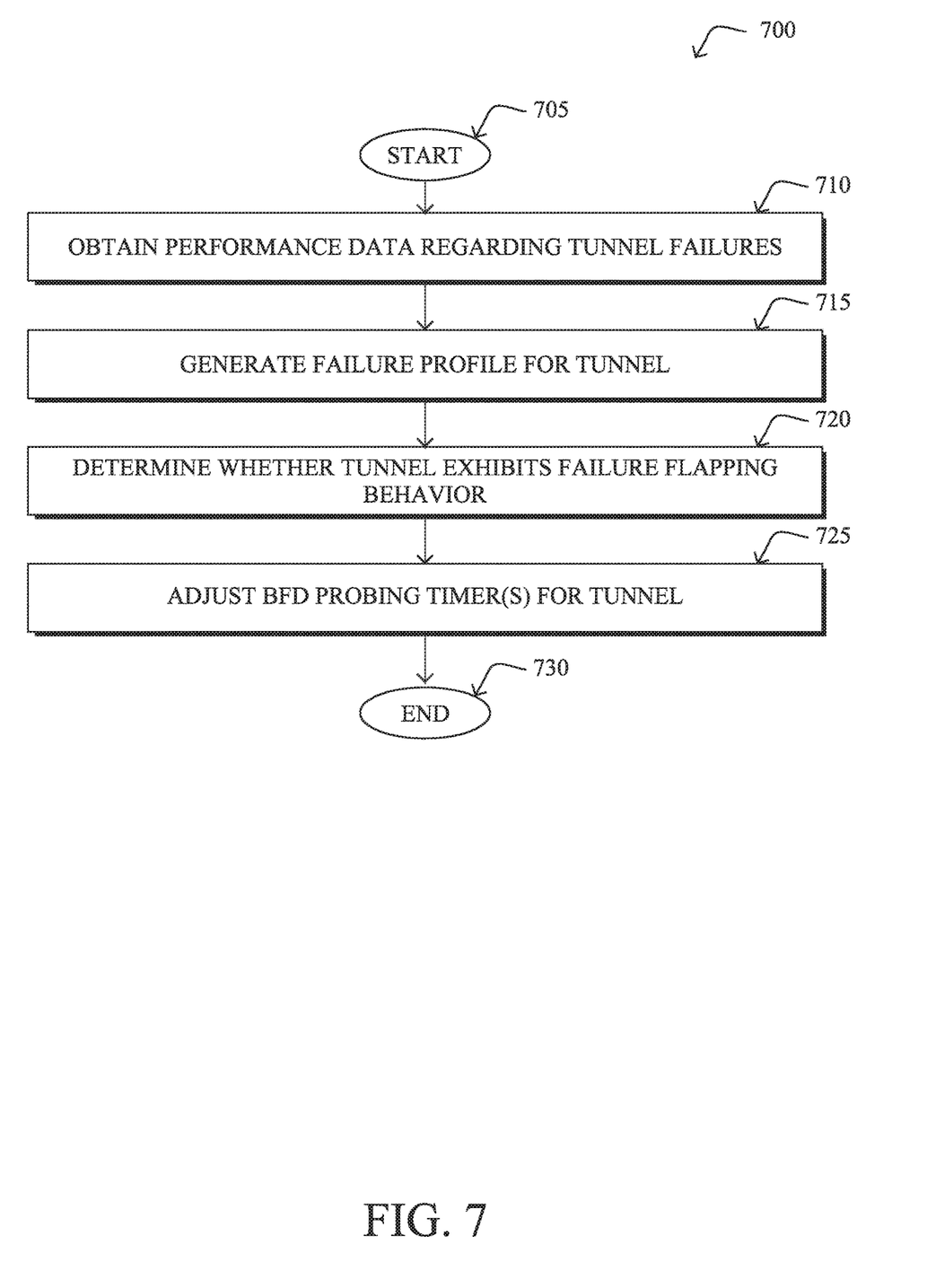
FIG. 7 illustrates an example simplified procedure for adjusting a probing timer for a tunnel.

FIG. 7 illustrates an example simplified procedure for adjusting a probing timer for a tunnel, in accordance with one or more embodiments described herein. For example, a non-generic, specifically configured device (e.g., device 200) may perform procedure 700 by executing stored instructions (e.g., process 248 and/or process 249). For example, the device may comprise an edge router of an SD-WAN (e.g., the head-end of a tunnel) and/or a device in communication therewith, to implement the teachings herein. As shown, the procedure 700 may start at step 705 and continue on to step 710 where, as described in greater detail above, the device may obtain performance data regarding failures of a tunnel in a network. In various embodiments, the performance data may be indicative of a number of failures of the tunnel and how long the tunnel is down after each of these failures.

At step 715, as detailed above, the device may generate a failure profile for the tunnel by applying machine learning to the performance data regarding the failures of the tunnel. In some embodiments, the device may do so by applying clustering to the performance data regarding the failures of the tunnel, to assign the tunnel to a cluster of tunnels. In turn, the device may assess whether the tunnels assigned to the cluster exhibit failure flapping behavior. For example, the device may assess whether the cluster represents tunnels that have a low number of failures, a high number of failures, a low fraction of time down, a high fraction of time down, etc.

At step 720, the device may determine, based on the failure profile for the tunnel, whether the tunnel exhibits failure flapping behavior, as described in greater detail above. Notably, if the profile of the tunnel indicates that the tunnel repeatedly alternates between being down and up, the device may flag the tunnel as exhibiting failure flapping behavior.

At step 725, as detailed above, the device may adjust one or more BFD probing timers used to detect failures of the tunnel, based on the determination as to whether the tunnel exhibits failure flapping behavior. For example, the timer(s) may include an interval timer that controls a frequency at which BFD probes are sent via the tunnel or a timeout timer that controls when the tunnel is deemed to have failed after a BFD probe is sent via the tunnel and was unacknowledged. In one embodiment, if the tunnel does not exhibit failure flapping behavior, the adjustment may entail incrementally reducing the timeout timer, until a failure rate of the tunnel increases. This allows the system to 'learn' the optimal timeout to afford the tunnel enough time to acknowledge probes. In a further embodiment, if the tunnel exhibits failure flapping behavior, the adjustment may entail increasing the interval timer or timeout timer. Indeed, it may be the case that the tunnel is not actually failing but is simply unable to keep up with the probing mechanism. In a further embodiment, the adjustment may also be based in part on whether there exists a suitable backup tunnel for the tunnel that can satisfy the SLA of the traffic on the tunnel. Such information can be used to control whether the timer(s) are even adjusted at all. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a machine learning-based approach for optimizing the sending of BFD probes in an SD-WAN or other network. The key advantage of this approach is a dynamical adjustment of BFD parameters based on the local context and the specificities of the tunnel, local router, and/or service provider. Notably, the techniques herein are able to dynamically detect links for which BFD timers may be reduced, leading to better convergence time with no risk of oscillation. Conversely, the techniques herein are also capable of identifying high flapping tunnels for which BFD timers may be increased when no secondary paths meeting the required SLA are available.

While there have been shown and described illustrative embodiments that provide for the dynamic adjustment of BFD timers in a network, it is to be understood that various other adaptations and modifications may be made within the spirit and scope of the embodiments herein. For example, while certain embodiments are described herein with respect to using certain models for purposes of modeling link failures, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   obtaining, by a device, performance data regarding failures of a tunnel in a network;
   generating, by the device, a failure profile for the tunnel by applying machine learning to the performance data regarding the failures of the tunnel;
   determining, by the device and based on the failure profile for the tunnel, whether the tunnel exhibits failure flapping behavior, wherein the failure flapping behavior is indicative of oscillation between up and down states; and
   adjusting, by the device, one or more Bidirectional Forwarding Detection (BFD) probing timers used to detect failures of the tunnel, based on the determination as to whether the tunnel exhibits failure flapping behavior by reducing, based on a determination that the tunnel does not exhibit failure flapping behavior, a timeout timer that controls when the tunnel is deemed to have failed after a BFD probe is sent via the tunnel and was unacknowledged.

2. The method as in claim 1, wherein the performance data is indicative of a number of failures of the tunnel and how long the tunnel is down after each of these failures.

3. The method as in claim 1, wherein the one or more BFD probing timers further comprise an interval timer that controls a frequency at which BFD probes are sent via the tunnel.

4. The method as in claim 3, wherein adjusting the one or more BFD probing timers comprises:
   increasing the interval timer or timeout timer, based on a determination that the tunnel exhibits failure flapping behavior attributable to a misconfigured BFD probing timer.

5. The method as in claim 1, wherein reducing, based on the determination that the tunnel does not exhibit failure flapping behavior, a timeout timer is done incrementally until a failure rate of the tunnel increases.

6. The method as in claim 1, wherein the device adjusts the one or more BFD probing timers based further in part on a determination that a backup tunnel does not exist in the network for the tunnel that can satisfy a service level agreement (SLA) associated with traffic on the tunnel.

7. The method as in claim 1, further comprising:
   continuing to adjust the one or more BFD probing timers until the tunnel no longer exhibits failure flapping behavior.

8. The method as in claim 1, wherein generating the failure profile for the tunnel by applying machine learning to the performance data regarding the failures of the tunnel comprises:
   applying clustering to the performance data regarding the failures of the tunnel, to assign the tunnel to a cluster of tunnels; and
   assessing whether the tunnels assigned to the cluster exhibit failure flapping behavior.

9. The method as in claim 1, wherein the network is a software-defined wide area network (SD-WAN).

10. An apparatus, comprising:
    one or more network interfaces to communicate with a network;
    a processor coupled to the network interfaces and configured to execute one or more processes; and a memory configured to store a process executable by the processor, the process when executed configured to:
  obtain performance data regarding failures of a tunnel in a network;
  generate a failure profile for the tunnel by applying machine learning to the performance data regarding the failures of the tunnel;
  determine, based on the failure profile for the tunnel, whether the tunnel exhibits failure flapping behavior, wherein the failure flapping behavior is indicative of oscillation between up and down states; and
  adjust one or more Bidirectional Forwarding Detection (BFD) probing timers used to detect failures of the tunnel, based on the determination as to whether the tunnel exhibits failure flapping behavior by reducing, based on a determination that the tunnel does not exhibit failure flapping behavior, a timeout timer that controls when the tunnel is deemed to have failed after a BFD probe is sent via the tunnel and was unacknowledged.

11. The apparatus as in claim 10, wherein the performance data is indicative of a number of failures of the tunnel and how long the tunnel is down after each of these failures.

12. The apparatus as in claim 10, wherein the one or more BFD probing timers further comprise an interval timer that controls a frequency at which BFD probes are sent via the tunnel.

13. The apparatus as in claim 12, wherein the apparatus adjusts the one or more BFD probing timers by:
  increasing the interval timer or timeout timer, based on a determination that the tunnel exhibits failure flapping behavior attributable to a misconfigured BFD probing timer.

14. The apparatus as in claim 10, wherein reducing, based on the determination that the tunnel does not exhibit failure flapping behavior, a timeout timer is done incrementally until a failure rate of the tunnel increases.

15. The apparatus as in claim 10, wherein the apparatus adjusts the one or more BFD probing timers based further in part on a determination that a backup tunnel does not exist in the network for the tunnel that can satisfy a service level agreement (SLA) associated with traffic on the tunnel.

16. The apparatus as in claim 10, wherein the process when executed is further configured to:
  continue adjusting the one or more BFD probing timers until the tunnel no longer exhibits failure flapping behavior.

17. The apparatus as in claim 10, wherein the apparatus generates the failure profile for the tunnel by applying machine learning to the performance data regarding the failures of the tunnel by:
  applying clustering to the performance data regarding the failures of the tunnel, to assign the tunnel to a cluster of tunnels; and
  assessing whether the tunnels assigned to the cluster exhibit failure flapping behavior.

18. The apparatus as in claim 10, wherein the network is a software-defined wide area network (SD-WAN).

19. The apparatus as in claim 10, wherein the apparatus comprises a head-end router for the tunnel.

20. A tangible, non-transitory, computer-readable medium storing program instructions that cause a device to execute a process comprising:
  obtaining, by a device, performance data regarding failures of a tunnel in a network;
  generating, by the device, a failure profile for the tunnel by applying machine learning to the performance data regarding the failures of the tunnel;
  determining, by the device and based on the failure profile for the tunnel, whether the tunnel exhibits failure flapping behavior, wherein the failure flapping behavior is indicative of oscillation between up and down states; and
  adjusting, by the device, one or more Bidirectional Forwarding Detection (BFD) probing timers used to detect failures of the tunnel, based on the determination as to whether the tunnel exhibits failure flapping behavior by reducing, based on a determination that the tunnel does not exhibit failure flapping behavior, a timeout timer that controls when the tunnel is deemed to have failed after a BFD probe is sent via the tunnel and was unacknowledged.

* * * * *